Dec. 12, 1967 V. A. MARTENS ET AL 3,357,682
FOOD MIXER WITH COMBINED BEATER EJECTOR
AND LATCH RELEASE BUTTON ON HANDLE
Filed Oct. 31, 1966 2 Sheets-Sheet 1

INVENTORS.
VINCENT A. MARTENS
RAYMOND B. REYNOLDS
BY
Bertha L. MacGregor
ATTORNEY Dec. 12, 1967  V. A. MARTENS ET AL  3,357,682
FOOD MIXER WITH COMBINED BEATER EJECTOR
AND LATCH RELEASE BUTTON ON HANDLE
Filed Oct. 31, 1966  2 Sheets-Sheet 2

INVENTORS.
VINCENT A. MARTENS
RAYMOND B. REYNOLDS
BY
Bertha L. MacGregor
ATTORNEY

United States Patent Office 3,357,682
Patented Dec. 12, 1967

3,357,682
FOOD MIXER WITH COMBINED BEATER EJECTOR AND LATCH RELEASE BUTTON ON HANDLE
Vincent A. Martens and Raymond B. Reynolds, Racine, Wis., assignors to Scovill Manufacturing Company, Waterbury, Conn., a corporation of Connecticut
Filed Oct. 31, 1966, Ser. No. 590,971
8 Claims. (Cl. 259—1)

This invention relates to a food mixer with a combined beater ejector and latch release button on the mixer handle.

The main object of this invention is to provide means for storing a food mixer in a tray or on a support which may be mounted on a wall. The tray includes a latch for locking the mixer in the tray. The latch can be released by actuating the button which also actuates the beater ejector means.

When the mixer has been used in the usual manner for mixing food ingredients, the beater shafts may be ejected by ejector means without handling the beaters. After ejection of the beaters, the mixer may be stored in the wall tray by placement of the mixer therein, where it is locked in the intended position until released by actuation of the ejector mechanism which unlocks latching mechanism mounted in the tray or support. Thus the mixer can be stored and retained in a tray or on a support and be released when desired without the aid of any releasing mechanism other than the conventional beater ejector mechanism now in use in food mixers.

The advantages of the invention will be apparent from the drawings and following specification.

Figure 1:
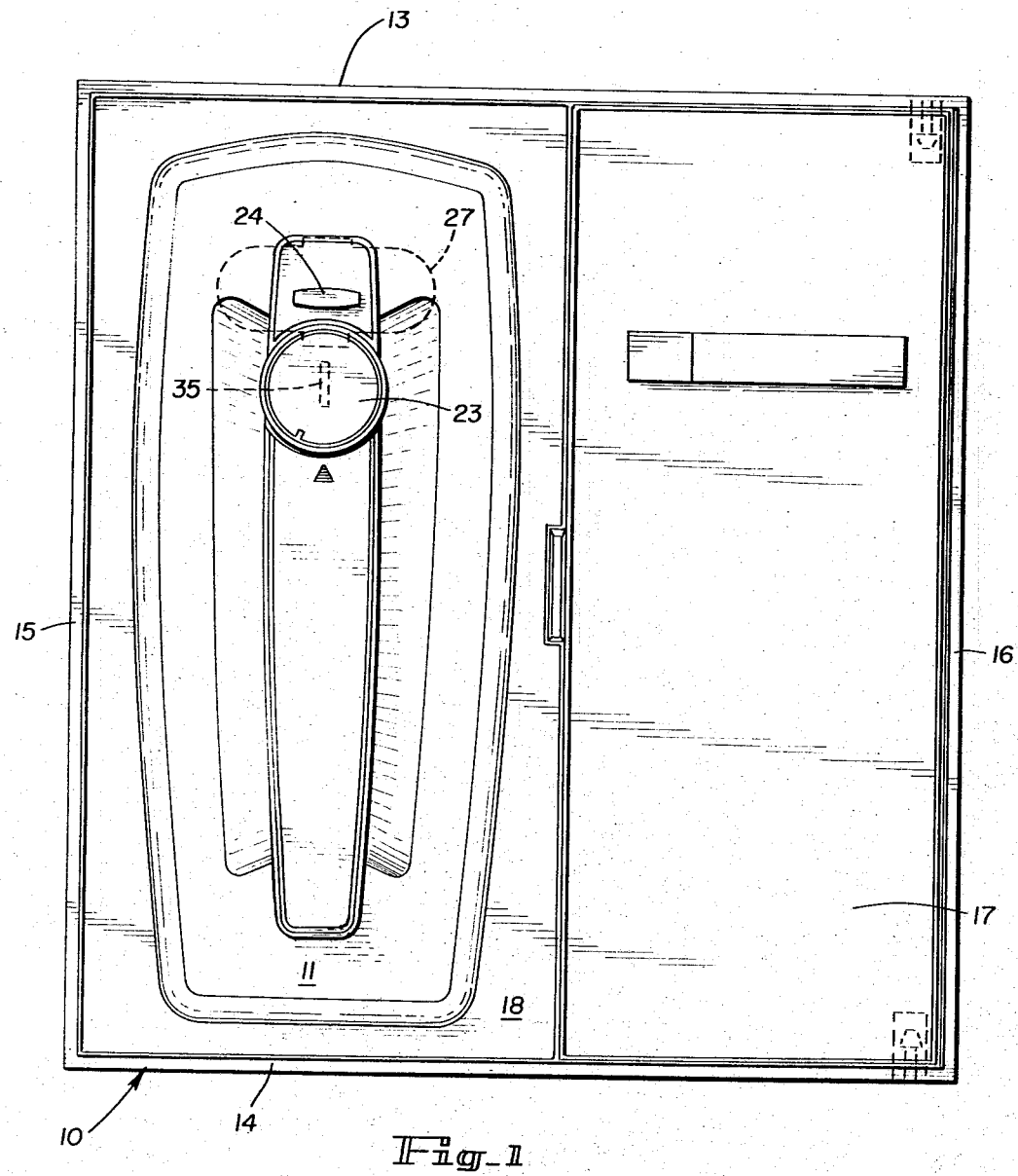
FIG. 1 is an elevational front view of a food mixer storage tray mounted on a wall, showing the food mixer embodying our invention in top plan elevation as it appears when locked in position in the storage tray.

In that embodiment of the invention shown in the drawings, the storage tray 10 is externally box-like in form, fitted internally with supporting means for the mixer 11. The tray 10 has a rear wall 12 which faces the wall on which it may be mounted, upper and lower end walls 13, 14, and side walls 15, 16. Part of the tray 10 may be used for cord storage and be provided with a front closure 17. That part of the tray which supports the mixer 11 when not in use is provided adjacent its inner wall surfaces with mixer supporting means 18 generally complemental to the lower half of the mixer housing.

The mixer 11 may vary in form, but as shown it comprises a lower housing 20, upper housing 21 connected to the part 20, and a hand grip portion 22 integral with the part 21. A motor speed control dial is indicated at 23 and a beater ejector button at 24. The button 24 is mounted on the upper end of an ejector rod 25 bent to form a horizontally disposed pressure exerting foot 26 for bearing on the ejector 27.

The ejector 27 comprises a hollow tubular body having a centrally apertured end 28, the aperture in the end 28 being smaller in diameter than the inner diameter of the hollow tubular body of the ejector 27 to accommodate the headed screw 29 and the coiled spring 30. The screw 29 extends through the apertured end 28 of the ejector and through the pressure exerting foot 26 of the ejector rod 25, and attaches the ejector 27 to a fixed part of the mixer in such manner that the ejector can slide relatively to the screw 29. The ejector 27 has laterally extending arms (FIG. 1) which bear on collars attached to beater shafts (not shown) as described in U.S. Patent No. 2,974,935 assigned to the assignee of this invention, but the invention is not confined to be used with any specific form of ejector or beater contacting means. Depression of the button 24 moves the ejector rod 25 downwardly, the pressure exerting foot 26 bearing on the upper end 28 of the ejector body 27 to move the ejector downwardly, thereby compressing the spring 30 which returns the ejector to raised position when pressure on the button 24 is released.

The described operation of the ejector mechanism is employed to eject the beater shafts from the mixer, and it is also employed to release the mixer from the latching means in the storage tray 10 which locks the mixer (without the beaters) in the tray when not in use. The mixer housing 20 is provided with a slot 35 in its bottom, extending longitudinally of the mixer, near the ejector 27 and adjacent a latch-engaged member 36 affixed to the inner surface of the mixer housing. The slot 35 receives the latching means described hereinafter.

The tray 10 may be provided with legs or flanges 37 which space the rear 12 from the wall on which the storage tray is mounted, to provide room for latching mechanism 38 mounted in the tray wall 12. The latching mechanism comprises a base 39 provided with a beveled end surface 40 and latch 41. The latch 41 extends through the rear wall 12. The base 39 is slidably mounted in the wall. The base 39 has a reduced extension 42 surrounded by a coiled spring 43 which bears at one end against the base 39 and at the opposite end against a stop plate 44 connected to the tray rear 12 by screws 45.

Figure 2:
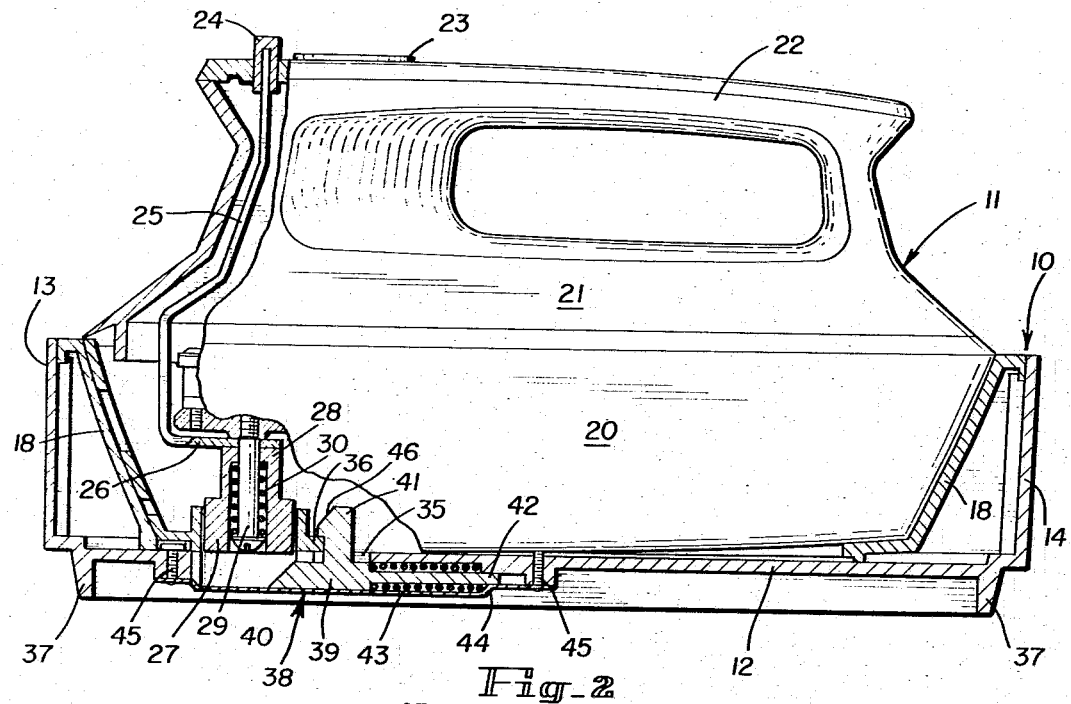
FIG. 2 is an elevational side view of the food mixer and storage tray, partly in section, as they appear in FIG. 1.

The latch mechanism 38 normally is in the position shown in FIG. 2. In order to store the mixer 11 in the tray 10, the beater shafts (not shown) are removed, and the mixer is placed in the tray in position to receive the latch 41 in the slot 35 in the bottom of the mixer housing. Pressure is exerted against the beveled surface 46 on the latch 41 by the latch-engaged member 36 fixed on the inner surface of the mixer housing. This causes the latch mechanism 38 as a whole to move toward the right of FIG. 2, and then to snap into the locking position shown in said figure under influence of the spring 43.

Figure 3:
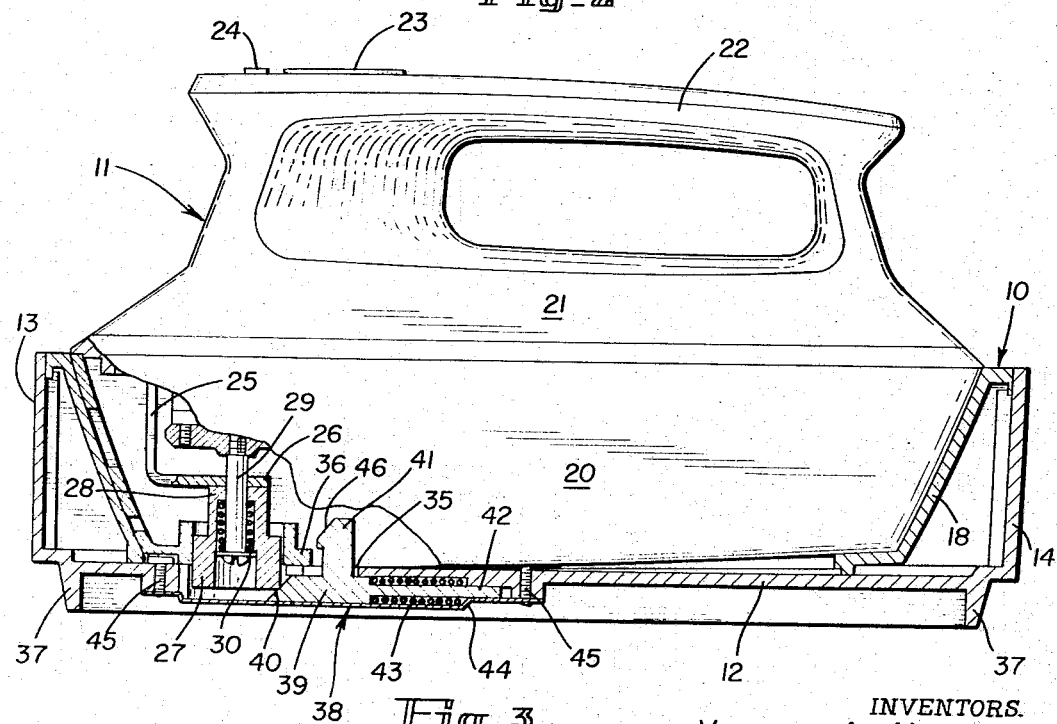
FIG. 3 is a view similar to FIG. 2 showing the locking mechanism in released position permitting removal of the mixer from the tray.

To remove the mixer from stored position, the ejector button 24 is depressed, causing the ejector rod foot 26 to depress the ejector 27 and to bear on the beveled surface 40 on base 39 to thereby push the latch mechanism into the unlatching position of FIG. 3. Then the mixer can be removed while holding down the button 24. After having been released, the latching mechanism automatically returns to the FIG. 2 position under influence of the spring 42, and the ejector 27 in the mixer automatically returns under influence of spring 30 to its normal position as shown in FIG. 2.

In describing the invention, reference has been made to a particular example embodying the same, but we wish it to be understood that the invention is not limited to the construction shown in the drawing and that variout changes may be made in the construction and general arrangement of parts without departing from the invention.

We claim:

1. The combination of a food mixer and a tray for supporting the mixer when not in use, said mixer being provided with removable beaters, comprising
   (a) a mixer housing,
   (b) a combined beater ejector and latch release button mounted on the housing, (c) latching means mounted in the tray,
(d) means on the mixer housing for engaging the latching means to lock the mixer in the tray, and
(e) combined beater ejector and latch release mechanism in the housing actuated by said button for ejecting the beaters and for leasing the latching means from the mixer for removal of the mixer from the tray.

2. The mechanism defined by claim 1, in which the latching means comprises a base slidably mounted on the tray and beveled latch on the base, and the means on the mixer housing for engaging the latching means is a slot adapted to receive the beveled latch.

3. The mechanism defined by claim 1, in which the latching means comprises a base slidably mounted on the tray, spring means on the base automatically urging the latching means into latching position, and a beveled latch on the base extending through the tray, and the means on the mixer housing for engaging the latching means is a slot adapted to receive the beveled latch, the mixer housing adjacent the slot bearing on said beveled latch when the mixer is placed in the tray to slidably move the base and latch and to engage the latch when the housing has been moved past the beveled latch surface.

4. The mechanism defined by claim 1, in which the latching means comprises a base slidably mounted on the tray and a beveled latch on the base adapted to engage the mixer housing, asid base having a beveled end engaged by said ejector and latch release mechanism when the button is depressed, thereby slidably moving the base and latch to mixer releasing position.

5. The mechanism defined by claim 4, which includes a reduced extension on the latch base and a coiled spring surrounding said extension for automatically returning the latching mechanism to latching position from the mixer releasing position when pressure on the button has been released.

6. The mechanism defined by claim 1, in which the combined beater ejector and latch release mechanism comprises an ejector rod connected to the button, an ejector body yieldingly mounted in the mixer housing, said ejector rod having a foot bearing on the ejector body for moving the body when the button is depressed, and means for automatically returning the ejector body when pressure on the button is released, said ejector body having beater engaging portions, and a latching means engaging portion which moves the latch to mixer releasing position when the button is depressed.

7. The combination of a food mixer having removable beaters and a tray for supporting the mixer when not in use, comprising
(a) a mixer housing having a handle,
(b) a combined beater ejector and latch release button mounted on the handle,
(c) latching means comprising a base slidably mounted on one surface of the tray and a latch on the base extending through the tray and exposed on the opposite surface,
(d) means on the mixer housing for engaging the latching means to lock the mixer in the tray, and
(e) combined beater ejector and latch release mechanism in the housing connected to said button for ejecting the beaters and for releasing the latching means from the mixer for removal of the mixer from the tray.

8. The mechanism defined by claim 7, in which the latching means base has a beveled surface engaged by the combined beater ejector and latch release mechanism, and the latch has a beveled surface engaged by the mixer housing when the housing is being placed into the tray.

References Cited
UNITED STATES PATENTS 2,730,901  1/1956  Ripple.
2,974,935  3/1961  Smader _____ 259—1

WILLIAM I. PRICE, *Primary Examiner.*